United States Patent [19]

Mery et al.

[11] Patent Number: 5,553,691
[45] Date of Patent: Sep. 10, 1996

[54] MECHANICALLY ACTUATED DRUM BRAKE

[75] Inventors: Jean Claude Mery, Pavillons sous Bois; Pierre Pressaco, La Courneuve, both of France

[73] Assignee: AlliedSignal Europe Services Techniques, Drancy, France

[21] Appl. No.: 133,101
[22] PCT Filed: Oct. 5, 1993
[86] PCT No.: PCT/FR93/00978
 § 371 Date: Mar. 15, 1995
 § 102(e) Date: Mar. 15, 1995
[87] PCT Pub. No.: WO94/10473
 PCT Pub. Date: May 11, 1994

[30] Foreign Application Priority Data

Oct. 30, 1992 [FR] France ................................. 92 13049

[51] Int. Cl.$^6$ ........................................................ F16D 51/50
[52] U.S. Cl. ........................... 188/338; 74/532; 188/106 F
[58] Field of Search ............................. 188/106 F, 106 P, 188/265, 326, 331; 74/480 R, 519, 532

[56] References Cited

U.S. PATENT DOCUMENTS

| 2,775,315 | 12/1956 | Maruhn et al. | 188/331 |
| 3,708,044 | 1/1973 | Torri et al. | 188/106 F |
| 3,757,908 | 9/1973 | Fisher | 188/265 |
| 4,678,067 | 7/1987 | Thompson | 188/106 F |
| 5,484,042 | 1/1996 | Wang | 188/106 F |

FOREIGN PATENT DOCUMENTS

| 2536142 | 5/1984 | France . |
| 145700 | 5/1936 | Germany . |

Primary Examiner—Robert J. Oberleitner
Assistant Examiner—Chris Schwartz
Attorney, Agent, or Firm—Leo H. McCormick, Jr.

[57] ABSTRACT

A drum brake having a support plate (10) with first and second shoes (12,14) slidably mounted thereon. Each of the shoes (12,14) having a web (12a,14a) and a rim (12b,14b) with a face for receiving a friction lining (16,18). Each web (12a,14a) has a first end and a second end. The rim holds the friction lining in a position to engage a drum (20) in response to an input force applied to the first end of the webs (12a,14a) of the shoes (12,14) by a hydraulic actuation device (22). A bearing member (28) is secured to the support plate (10) and is connected to a second end of the webs (12a,14a). A spacer device (40) arranged in the vicinity of the hydraulic device has a variable length to establish a spacing between the shoes (12,14) and drum (20). A mechanical actuation device (50) secured to a web (14a) of shoe (14) has a first actuation lever (60) and a second lever (70). A force applied to the first lever (60) is articulated through the second lever to act on the web (12a) of shoe (12) such that a brake force is substantially distributed to bring each friction lining (16,18) into engagement with the drum (20) and effect a brake application.

3 Claims, 1 Drawing Sheet

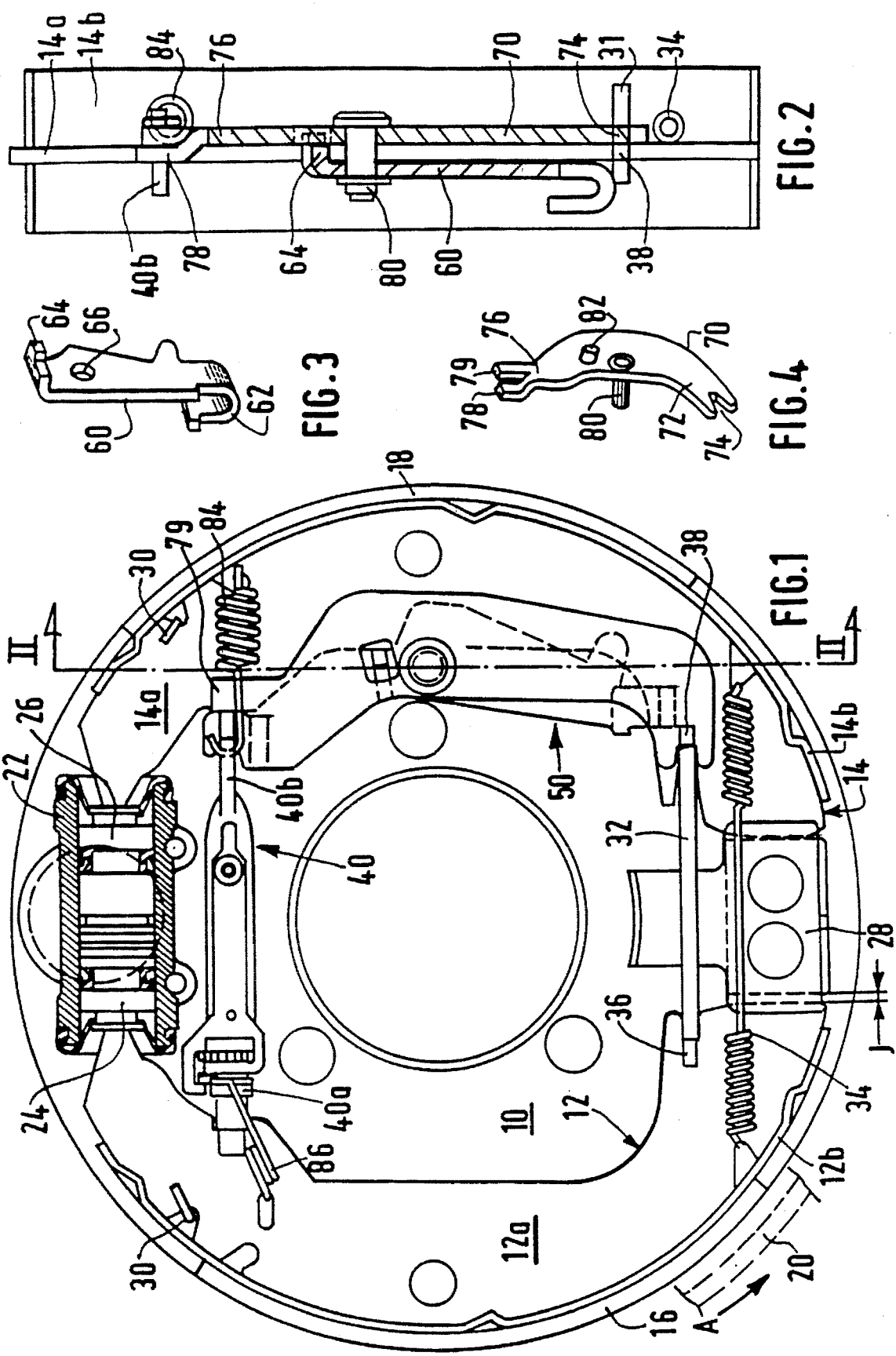

5,553,691

MECHANICALLY ACTUATED DRUM BRAKE

The present invention relates to mechanically actuated drum brakes, this mechanical control constituting an auxiliary means for actuating the drum brake which already possesses a main brake motor, for example hydraulic, the mechanical control constituting a parking brake or emergency brake.

BACKGROUND OF THE INVENTION

More precisely, the invention relates to a drum brake comprising a support plate, first and second shoes slidably mounted on the support plate and each one comprising a web and a rim, each rim having, opposite the drum, a face bearing a friction lining; a hydraulic actuation device, capable of acting on a first end of the web of each shoe to press its friction lining against the drum; a first spacer of variable length arranged between the shoes in the vicinity of the first end of their respective webs, to determine the separation of these shoes; a bearing component secured to the support plate and capable of acting as a bearing face for the second end of the web of each shoe; and a mechanical actuation device.

SUMMARY OF THE INVENTION

In general, this mechanical actuation device comprises a lever articulated at one of its ends to the web of one of the shoes and comprising, at an intermediate point close to this articulation, a slot provided so as to interact with the spacer of variable length and allow the shoes to be stressed away from each other under the action of a control cable fastened to the other end of the lever.

Such an arrangement of hydraulic and mechanical actuators, known in the art by the expression "with floating shoes" due to the absence of anchorage of the webs of the shoes on the bearing component securely fastened to the support plate, requires the mechanical actuator to make use of a very large actuation force.

Other drum brake arrangements are known, for example from the document FR-A-2 536 142, and known in the art by the expression "twin-booster", which do not have a bearing component between the ends of the webs of the shoes which are then articulated to one another. Such brakes have very high efficiency, but very mediocre stability during hydraulic actuation, and lead to very unbalanced wear in the friction linings.

The object of the present invention is therefore to produce a drum brake having the advantages of the two arrangements recalled hereinabove without exhibiting their drawbacks.

To this end, the invention proposes producing a drum brake of floating shoe design when it is actuated hydraulically, and of twin-booster design when it is actuated mechanically.

This object is achieved, according to the invention, with a mechanical actuation device which comprises a first actuating lever, a second force-distributing lever, and a second spacer which is arranged between the shoes in the vicinity of the second end of their respective webs, the first lever having a first end capable of receiving an actuation force, and a second end which is opposite the first and via which this lever can press, under the effect of the actuation force, against the first shoe to force it toward the drum, the second lever having first and second ends bearing on the respective ends of the first and second spacers which are located on the first shoe side, and the first and second levers being articulated on one another at an articulation point which is intermediate between their respective ends.

Preferably, a slight clearance exists, at rest, between the second ends of the webs of the shoes and the bearing component, and the first and second levers are arranged on either side of the web of the first shoe.

Other objects, features and advantages will emerge clearly from the description which follows of an embodiment of the invention given by way of non-limiting example, with reference to the appended drawings.

BRIEF DESCRIPTION OF THE INVENTION

FIG. 1 represents a front view of a drum brake produced in accordance with the present invention;

FIG. 2 represents a sectional view along the line II—II of FIG. 1;

FIG. 3 represents a perspective view of a mechanical actuation lever used in the drum brake of FIG. 1; and FIG. 4 represents a perspective view of a force distribution lever used in the drum brake of FIG. 1.

DETAILED DESCRIPTION OF THE INVENTION

The drum brake represented in FIG. 1 comprises a support plate 10 consisting of an approximately plane disk. This plate 10 is provided so as to be rigidly fastened to a fixed part of the vehicle, such as an axle flange (not shown).

Two brake shoes 12 and 14 are supported in a sliding fashion by the disk of the support plate 10, by virtue of usual mechanisms (not shown). In a well-known fashion, each of the shoes 12 and 14 comprises an approximately plane web 12a, 14a to which is fixed a rim 12b, 14b in the shape of a circular arc supporting, on its outer face, a friction lining 16 and 18 respectively.

The shoes 12 and 14 are placed on the support plate 10 so that the outer envelopes of the linings 16 and 18 are situated on the same circle whose axis is coincident with the axis of the support plate 10.

Thus, the linings 16 and 18 may come into contact with the internal surface of a brake drum 20 capping the two shoes and partially represented in dashed lines in FIG. 1. The drum 20 is concentric with the linings 16 and 18 and it is fixed to a revolving part such as a wheel of the vehicle (not shown).

A hydraulically controlled brake motor 22 is fixed to the support plate 10 between two first adjacent ends of the shoes 12 and 14. This brake motor 22 is fitted with two pistons 24 and 26 which operate in opposition so as to exert a thrust on the corresponding end of the web 12a, 14a of each of the shoes, when the brake motor is actuated.

A bearing block 28, also fixed to the support plate 10, is placed between the other two adjacent ends of the shoes 12 and 14.

A tension spring 30, only the ends of which have been shown, is interposed between the ends of the webs of the shoes between which the brake motor 22 is placed, in immediate proximity to the latter, in order to bring these ends close to one another when the motor is not actuated. A spacer 32 of fixed length, whose role will be explained later, is arranged between the shoes 12 and 14 in the vicinity of the bearing block 28, approximately parallel to the axis of the brake motor 22, and comprises, at its ends, scollops 36 and 38 interacting with corresponding scollops formed in the webs of the shoes 12 and 14 respectively. The ends of the shoes 12 and 14 are held bearing against the spacer 32 by means of a tension spring 34 interposed between the corresponding ends of the webs of the shoes, in immediate proximity to this spacer. In the rest position represented in FIG. 1, the distance between the bottom of the slots 36 and 38 is such that a small clearance J exists between the ends of the webs 12*a* and 14*a* of the shoes 12 and 14 and the bearing block 28.

Supposing the brake drum 20 revolves in the direction of the arrow A in FIG. 1 when the vehicle moves in a forward direction, the shoes 12 and 14 may be distinguished by the fact that the shoe 12 bears on the bearing block 28 when it is in frictional contact with the drum, whilst the shoe 14 bears on the piston 26 of the brake motor 22 under the same conditions. In order to account for this difference, the shoes 12 and 14 are respectively called "leading shoe" and "trailing shoe".

The drum brake represented in FIG. 1 additionally comprises a spacer 40 arranged between the shoes 12 and 14 in the vicinity of the brake motor 22, approximately parallel to the axis of the latter.

The spacer 40 has a variable length and it is equipped with automatic adjustment means allowing its length to be increased in a known fashion as the friction linings 16 and 18 wear.

For this purpose, the spacer 40 comprises two end components 40*a* and 40*b* in which there are respectively formed a scollop receiving the web of the shoe 12 and a scollop receiving the web of the shoe 14.

Cutouts formed in the region of the spacer 40 on the inside edge of the web of each of the shoes 12 and 14 allow the spacer to be held in place.

A mechanical actuation device, denoted overall by the reference 50 comprises a mechanical actuating lever 60 and a force distribution lever 70. The actuating lever 60, represented on its own in FIG. 3, is formed from a generally rectangular plane component with a first end 62 provided for a control cable (not shown) to be fastened thereto and a second end 64 forming a stud extending perpendicularly to the plane of the lever 60. An opening 66 is formed in the lever 60, at an intermediate point close to the end 64. The force distribution lever 70, represented on its own in FIG. 4, is formed from a generally rectangular plane component with a first end 72 formed with a scollop 74 interacting with the scollop 38 formed in the spacer 32. The second end 76 is formed with a cutout 78 extending parallel to the plane of the lever 70, and being offset with respect to the contiguous part 79 by a value close to the thickness of the lever 70. The lever 70 carries a spindle 80 extending perpendicularly to its plane, and a slit 82 is formed in proximity to this spindle 80.

As is better seen in FIG. 2, the levers 60 and 70 are arranged on either side of the web 14*a* of the shoe 14, so that the spindle 80 of the lever 70 penetrates the opening 66 of the lever 60, and so that the stud 64 bears on the edge of the web 14a, the same as the cutout 78. The levers 60 and 70 are thus articulated to one another. Of course, the spindle 80 could be carried by the lever 60 and the opening 66 could be formed in the lever 70.

Finally, the ends of a tension spring 84 are fastened respectively to the web of the trailing shoe 14 and on the end component 40*b*, so as to ensure permanent contact between the bottom of the scollop formed in the web of the shoe 14 and the bottom of the corresponding scollop formed in the end component 40*b*. In a comparable fashion, the end component 40*a* is stressed towards the web of the shoe 12 by a tension spring 86 whose ends bear respectively on the web of the shoe 12 and on the end component 40*a*.

The brake which has just been described operates in the following fashion:

At rest, the various elements of the brake occupy the positions represented in FIG. 1.

The force distribution lever 70 bears via its part 79 on the spacer 40, via the scollop 74 on the spacer 32, and via the spindle 80 on the web 14*a* of the shoe 14. The actuating lever 60 bears via the opening 66 on the spindle 80 of the lever 70 and via the stud 64 on the web 14*a*.

When the brake is implemented hydraulically, the pressurization of the brake motor 22 stresses the shoes 12 and 14 radially. Since the shoe 14 bears, for example, against the block 28, the shoe 12 will pivot in the scollop 36 of the spacer 32 in order to cancel out the play J. When the shoes 12 and 14 both bear against the surfaces of the bearing block 28, the friction linings 16 and 18 are brought into frictional contact with the drum 20. If it is necessary to take up wear in the friction linings during this implementation, the spacer 40 extends automatically, its end components 40*a* and 40*b* remaining in contact with the webs 12*a* and 14*a* respectively, the spacing of the ends of the shoes 12 and 14 thus becoming greater at rest than before implementing the brake motor 22.

When the brake is implemented mechanically, the actuating lever 60 is stressed to the left looking at FIG. 1, by traction of its end 62.

The lever 60 therefore bears via its stud 64 on the web 14*a* of the shoe 14, and the opening 66 interacts with the spindle 80 in order to stress the force distribution lever 70 also towards the left looking at FIG. 1.

The stud 64 moving freely in the opening 82 of the lever 70 stresses the shoe 14 to the right looking at FIG. 1, whilst the lever 70 stresses the shoe 12 to the left, by means of the spacers 32 and 40. Since the lever 70 is actuated via its spindle 80, it acts as a balance bar on the spacers 32 and 40 and thus fulfils the role of distributing, over the shoe 12, the forces applied by the lever 60 acting on the shoe 14.

It can therefore be clearly seen that a drum brake has been produced having the advantages of a floating shoe brake when implemented hydraulically and the advantages of a twin-booster brake when implemented mechanically for parking or emergency braking. Indeed, high brake stability is obtained during hydraulic actuation, and high efficiency during mechanical actuation, used hypothetically for much less frequent braking actions.

Other advantages result from the specific design of the drum brake according to the invention. Thus, when the vehicle thus equipped is stationary following a hydraulic implementation, the webs of the shoes 12 and 14 are firmly stressed against the bearing block 28. The force exerted on the actuating lever will therefore not be used in order to separate the shoes 12 and 14 from the bearing block 28, but in order to bring the various elements of the brake into a configuration such that, if the hydraulic pressure in the brake motor 22 is released, shoes 12 and 14 retain their position of frictional engagement with the drum 20.

Of course, the invention is not limited to the embodiment which has just been described, but may receive modifications which will be evident to the person skilled in the art. Thus, the actuation device 50 can be arranged on the leading shoe instead of the trailing shoe as has been shown.

We claim:

1. A drum brake comprising a support plate; first and second shoes slidably mounted on the support plate and each one comprising a web and a rim, each rim having opposite the drum a face bearing a friction lining; a hydraulic actuation device capable of acting on a first end of the web of each shoe to press the friction linings against the drum; a first spacer of variable length arranged between the shoes in the vicinity of the first ends of the webs to determine the separation of the shoes; a bearing component secured to the support plate and capable of acting as a bearing face for second ends of the webs of each shoe; and a mechanical actuation device comprising a first actuating lever, a second force-distributing lever, and a second spacer arranged between the shoes in the vicinity of the second ends of the webs, said first lever having a first end capable of receiving an actuation force and an opposite second end via which the lever can press, under the effect of the actuation force, against the first shoe to force the first shoe toward the drum, said second lever having first and second ends bearing on the respective ends of the first and second spacers which are located adjacent said first shoe, and said first and second levers being articulated on one another at an articulation point which is intermediate between the respective lever ends.

2. Drum brake according to claim 1, characterized in that at rest a small clearance exists between the second ends of the webs of the shoes and the bearing component.

3. Drum brake according to claim 2, characterized in that the first and second levers are arranged on either side of the web of the shoe.

* * * * *